United States Patent [19]

Chang

[11] Patent Number: 4,854,879

[45] Date of Patent: Aug. 8, 1989

[54] SELF-TEACHING BOOK FOR CHILDREN WITH AN ELECTRONIC DEVICE

[76] Inventor: Dale Chang, 9 Fl., No. 303, Fushing North Rd., Taipei, Taiwan

[21] Appl. No.: 236,618

[22] Filed: Aug. 25, 1988

[51] Int. Cl.⁴ .............................................. G09B 7/06
[52] U.S. Cl. .................................................... 434/339
[58] Field of Search ........................................ 434/339

[56] References Cited

U.S. PATENT DOCUMENTS 3,106,027  10/1963  Thelen ................................ 434/339
4,522,599   6/1985  Harte ................................. 434/339

*Primary Examiner*—William H. Grieb
*Attorney, Agent, or Firm*—Keaty & Keaty

[57] ABSTRACT

A self-teaching book for children having a number of questions and a plurality of electronic teaching units on which a plurality of answers corresponding to each question are carried for the user to choose from. Each electronic teaching unit has seven supperimposed layers, the arrangement of which is an answer sheet, an upper conducting layer, an upper insulating layer, a source layer, a lower insulating layer, a lower conducting layer and a protective covering. A plurality of slots are respectively arranged within the upper and lower insulating layers to permit the contact between the source layer and one of the upper and lower conducting layers to activate an electronic device.

1 Claim, 4 Drawing Sheets

SELF-TEACHING BOOK FOR CHILDREN WITH AN ELECTRONIC DEVICE

BACKGROUND OF THE INVENTION

The present invention relates to a self-teaching book for children, and more particularly, relates to a book in which a number of questions are printed and electronic devices in the form of answer sheets are incorporated. The electronic device may make different responses corresponding to a correct or a wrong answer for each question.

Heretofore, many educational books or teaching devices with computer-based equipments have been developed in many parts of the world for educating people of different ages. However, it is not convenient for children to study educational books or to operate teaching devices by themselves.

The present invention provides a self-teaching book for children with an electronic device which indicates whether the answer chosen by the user is correct or incorrect.

SUMMARY OF THE INVENTION

A primary objective of the present invention is to provide a book for children in which a number of questions are given and which comprises electronic devices in the form of answer sheets, wherein a plurality of answers corresponding to each question are carried on the answer sheets for the user to choose from.

Another objective of the present invention is to provide a self-teaching book for children with an electronic device, wherein the electronic device will produce music, a sound or visual signal to tell the user whether or not his/her answer is correct. Still another objective of the present invention is to provide a self-teaching book for children with an electronic device which is easy to operate by fingers without the aid of other equipment.

Further objectives and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
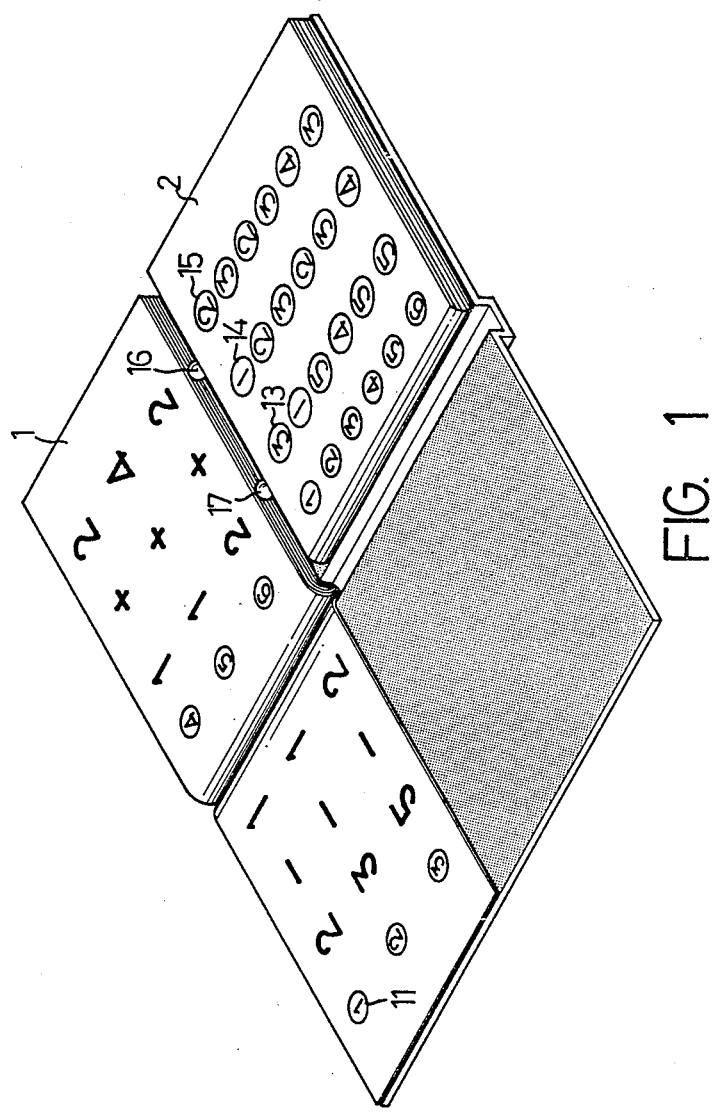
FIG. 1 is a perspective view of a self-teaching book for children with an electronic device in accordance with the present invention.

With reference to the drawings and in particular to FIG. 1 thereof, it can be seen that a self-teaching book for children with an electronic device in accordance with the present invention comprises a plurality of question pages 1 made of paper and a plurality of electronic teaching units 2 each of which corresponds to the individual question pages 1 and is a turnable rigid sheet in which the electronic device is incorporated. A plurality of test questions 11 are printed on the question pages 1 and a plurality of answers 13, 14 and 15 according to the test questions 11 are displayed on the answer sheet unit 2. It should be noted that other testing manners can be employed in such a self-teaching book; for example, Yes-No questions, and so on.

This invention relates to such a self-teaching book with an electronic device, of which the electronic teaching units 2 are provided with answer sites 13, 14 and 15. The user can choose the answer corresponding to each question by pressing the answer site with fingers. Although not limited thereto, the electronic device preferably produces music, sound or visual means 16 to indicate that the correct answer was pressed, and/or produces another kind of music, sound or visual means 17 to indicate that the wrong answer was chosen when the self-teaching book is employed.

Figure 2:
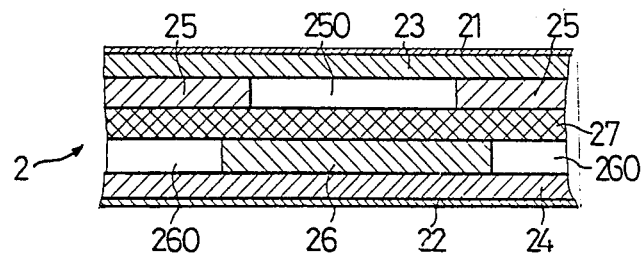
FIG. 2 is a partial sectional view of an embodiment of an electronic teaching unit of the self-teaching book of FIG. 1.

Referring to the sectional view in Fig.2, a preferred embodiment of this invention is shown, wherein the electronic teaching unit 2 comprises a plurality, here seven, of superimposed layers, all of which are elastic. Namely, each electronic teaching unit 2 comprises seven superimposed layers the arrangement of which is an answering sheet 21, an upper conducting layer 23, an upper insulating layer 25, a source layer 27, a lower insulating layer 26, a lower conducting layer 24 and a protective covering 22 from top to bottom.

It is apparent that the answer sheet 21 and protective covering 22 are employed to protect the electronic device from damage and insulates the electronic device from the outside.

A plurality of slots 250 and 260 (only part of which are shown) are respectively arranged within the upper and lower insulating layers 25 and 26 to permit the pressing action at the answer sites 13, 14 and 15 on the answer sheet 21. The pressing action at the answer sites 13, 14 and 15 causes a corresponding sinking, so that the upper conducting layer 23 contacts with the source layer 27 (shown in FIG. 3) or the source layer 27 contacts with the lower conducting layer 24 (shown in Fig.4) with respective to either upper or lower slots 250 or 260.

The arrangement of the slots 250 and 260 are preferably such that they do not overlap and provide a certain distance between the sites of the answers. Beside the answer sites, the upper surface of the answer sheet 21 does not sink, when pressed, because no slots are provided thereunder.

Furthermore, each of the slots is positioned corresponding to respective sites of the answers. For instance, the slots 250 within the upper insulating layer 25 are respectively provided under the sites of correct answers; similarly, the slots 260 within the lower insulating layer 26 are respectively provided under the sites of wrong answers. It should be noted that the arrangement of the slots 250 and 260 is not limited in the above-mentioned manner.

Figure 3:
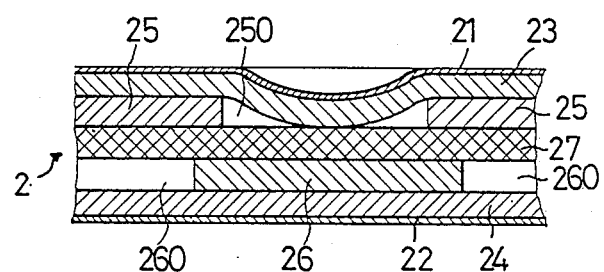
FIG. 3 is another partial sectional view, similar to FIG. 2 of the electronic teaching unit of the self-teaching book of FIG. 1 when the upper surface of the answer sheet unit is pressed.

It is appreciated that another arrangement of the electronic teaching units is acceptable since the electronic device can be designed to alternatively produce music, sound or visual signal to tell the user that the correct or wrong answers are chose. For example, the electronic teaching unit has five superimposed layers which are an answer sheet, a conducting layer, an insulated layer, a source layer and a protective layer. Comprehensibly, only an electronic circuit is connected to the conducting layer of such an electronic teaching unit to identify the correct answers or the wrong answers. Referring particularly to FIG. 3, it can be seen that the upper conducting layer 23 is in contact with the source layer 27 when the upper conducting layer 23 is pushed down and sinks in the slot 250. Since the source layer 27 is connected to a power supply and the upper conducting layer 23 is connected to a first electronic circuit 3, the contact between the upper conducting layer 23 and the source layer 27 actuates the first electronic circuit 3.

Figure 4:
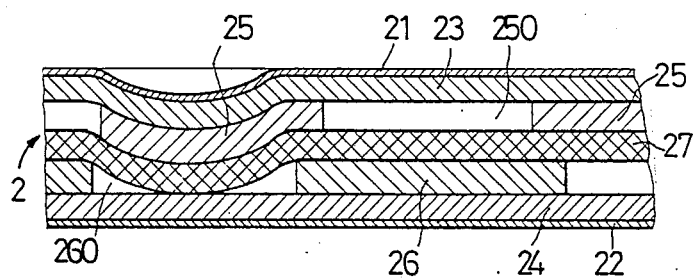
FIG. 4 is still another practical sectional view of the electronic teaching unit of the self-teaching book of FIG. 1 when the upper surface of the answer sheet unit is pressed in a position differing from that of FIG. 3.

Further referring to FIG. 4, it can be seen that the lower conducting layer 24 is in contact with the source layer 27 when the upper conducting layer 23, upper insulating layer 25 and source layer 27 are pushed down and the source layer 27 sinks in the slot 260. The lower conducting layer 24 is connected to a second electronic circuit 4; therefore, the contact between the source layer 27 and the lower conducting layer 24 actuates the second electronic circuit 4. Comprehensibly, the source layer 27 and the upper and lower conducting layers 23 and 24 are normally insulated.

Although not limited thereto, the first electronic circuit 3 is preferably connected to the upper conducting layers 23 of all the answer sheet units 2; likewise, the second electronic circuit 4 is connected to all the lower conducting layers 24.

Figure 5:
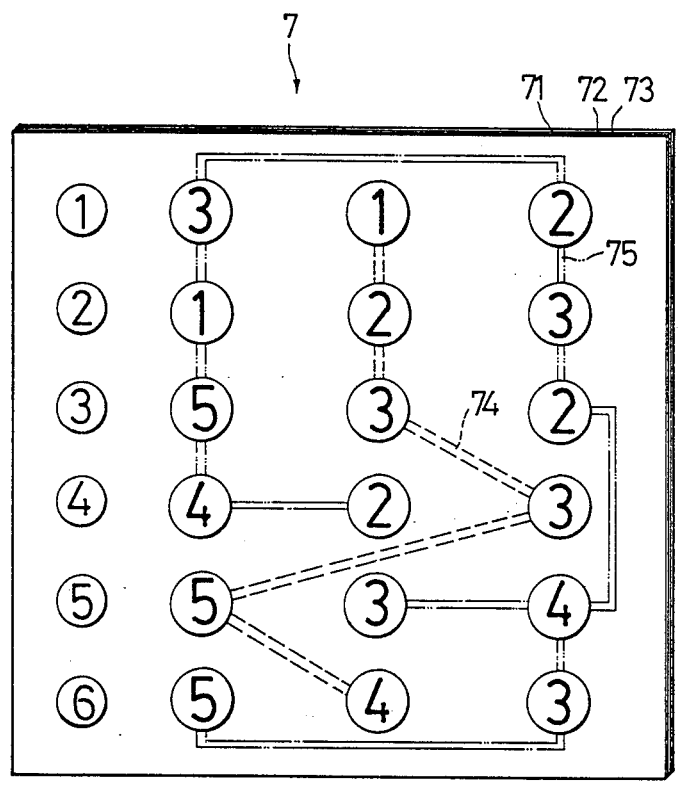
FIG. 5 is perspective view of another preferred embodiment of the configuration of the electronic teaching unit in accordance with this invention.

Further referring to FIG. 5, another preferred embodiment of the configuration of the electronic teaching unit 7 in accordance with this invention is shown. The electronic teaching unit 7 which employs the skill of printed conductors 74 and 75 shown in dotted lines as a membrane switch comprises three superimposed layers which are an answer sheet 71, a conducting film 72 and a protective layer 73, wherein all the correct answers disposed on the answer sheet 71 are connected by conductors 74 and all the wrong answers disposed on the answer sheet 71 are connected by conductors 75. The conducting film 72 is connected to an electronic circuit which is alternately the first electronic circuit or the second electronic circuit. Other techniques are acceptable in producing such an electronic teaching unit; for example, printed-circuit board is able to substitute for the conducting film.

Figure 6:
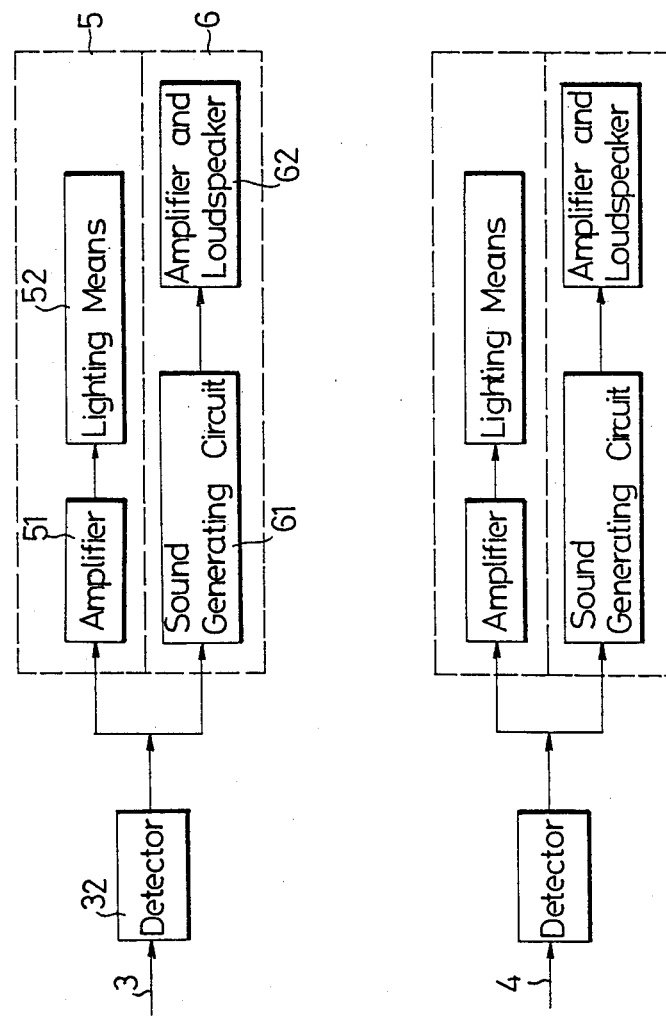
FIG. 6 is a block diagram of a preferred embodiment of a self-teaching book for children with an electronic device in accordance with the present invention.

With reference to FIG. 6, it can be seen that the first and second electronic circuits 3 and 4 which are preferably disposed in the cover of the self-teaching book are operated in the similar procedures. The differences between the first and second electronic circuits 3 and 4 are in the different kind of indicating music, indicating light or indicating audio signal.

When the contact is created between the source layer 27 and the upper conducting layer 23, a signal is produced and identified by a detector 32 to prevent fault actions caused by noise signals. After the identification of the input signal, the detector 32 sends signals respective to the lighting circuit 5 and/or sound generating circuit 6 which is then displayed in various manners; for example, music signal, synthetic language signal, audio signal and so on.

As is common in a conventional electronic circuits, an input signal from the detector 32 is amplified by an amplifier 51 and actuates a lighting means 52 to turn on; on the other hand, an input signal from the detector 32 activates a sound generating circuit 61, the output of which is amplified and converted into a musical sound or linguistic audio sound by an amplifier and loudspeaker 62.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A self-teaching book for children with an electronic device comprising a plurality of question pages and a plurality of electronic teaching units corresponding to said individual question pages; each of said electronic teaching units connected to at least one electronic circuit, which has at least one light circuit and one music generating circuit, wherein:

a plurality of test questions are printed on said question pages and a plurality of correct and incorrect answers corresponding to said questions are provided on said electronic teaching unit;

said electronic teaching unit comprises an answer sheet, at least one upper and one lower conducting layer, at least one upper and one lower insulating layer, a source layer, and a protective covering; said upper and lower insulating layers being respectively adjacent to said upper and lower conducting layers; said source layer being disposed between said upper and lower insulating layers; said lower conducting layer being disposed above and adjacent to said protective covering;

a plurality of slots are arranged within said upper insulating layer to permit a contact between said upper conducting layer and said source layer at answer sites;

a plurality of slots are arranged within said lower insulating layer to permit a contact between said lower conducting layer and said source layer at answer sites;

each of said slots does not overlap and is positioned corresponding to respective sites of said answers; and said upper and lower conducting layers are respectively connected to said electronic circuits; and said source layer is connected to a power supply and is contactable with said conducting layers to actuate respectively said electronic circuits.

* * * * *